United States Patent
Hudak et al.

(10) Patent No.: US 10,147,557 B2
(45) Date of Patent: Dec. 4, 2018

(54) ENHANCED STRUCTURAL SUPERCAPACITORS

(71) Applicant: The MITRE Corporation, McLean, VA (US)

(72) Inventors: Nicholas Hudak, Washington, DC (US); Alexander Schlichting, Arlington, VA (US); Kurt Eisenbeiser, Vienna, VA (US)

(73) Assignee: The MITRE Corporation, McLean, VA (US)

( * ) Notice: Subject to any disclaimer, the term of this patent is extended or adjusted under 35 U.S.C. 154(b) by 66 days.

(21) Appl. No.: 15/263,538

(22) Filed: Sep. 13, 2016

(65) Prior Publication Data

US 2018/0075982 A1   Mar. 15, 2018

(51) Int. Cl.
| | |
|---|---|
| *H01G 11/86* | (2013.01) |
| *H01G 11/40* | (2013.01) |
| *H01G 11/56* | (2013.01) |
| *H01G 11/36* | (2013.01) |
| *H01G 11/52* | (2013.01) |
| *H01G 11/48* | (2013.01) |
| *C09D 5/24* | (2006.01) |
| *C09D 179/00* | (2006.01) |

(52) U.S. Cl.
CPC ............... *H01G 11/86* (2013.01); *C09D 5/24* (2013.01); *C09D 179/00* (2013.01); *H01G 11/36* (2013.01); *H01G 11/40* (2013.01); *H01G 11/48* (2013.01); *H01G 11/52* (2013.01); *H01G 11/56* (2013.01)

(58) Field of Classification Search
CPC ........ H01G 11/86; H01G 11/36; H01G 11/40; H01G 11/48; H01G 11/52; H01G 11/56; C09D 5/24; C09D 179/00
See application file for complete search history.

(56) References Cited

U.S. PATENT DOCUMENTS

| | | |
|---|---|---|
| 6,872,330 B2 | 3/2005 | Mack et al. |
| 7,553,341 B2 | 6/2009 | Pan et al. |
| 8,343,572 B2 | 1/2013 | Varade et al. |
| 8,520,365 B2 | 8/2013 | Gruner et al. |
| 8,659,874 B2 | 2/2014 | Shaffer et al. |
| 8,665,581 B2 | 3/2014 | Fleischer et al. |
| 8,778,800 B1 | 7/2014 | Chang et al. |
| 8,787,001 B2 | 7/2014 | Fleischer et al. |

(Continued)

FOREIGN PATENT DOCUMENTS

WO     WO 2013/136034     9/2013

OTHER PUBLICATIONS

Kim, Yong Jung et al. "Chemically Modified Multiwalled Carbon Nanotubes as an Additive for Supercapacitors," Small 2(3): pp. 339-45, Mar. 2006.

(Continued)

*Primary Examiner* — Dion R Ferguson
(74) *Attorney, Agent, or Firm* — Morrison & Foerster LLP

(57) ABSTRACT

The present disclosure is directed to structural supercapacitors and electrodes for structural supercapacitors having high energy storage and high mechanical characteristics and methods of making the structural supercapacitors and electrodes. The structural supercapacitors can include a solid electrolyte and carbon fiber electrodes comprising carbon nanotubes, surface functionalized redox-active moieties, and/or a conducting polymer.

26 Claims, 14 Drawing Sheets

(56) References Cited

U.S. PATENT DOCUMENTS

| | | | |
|---|---|---|---|
| 8,951,306 B2 | 2/2015 | Yu et al. | |
| 9,017,854 B2 | 4/2015 | Fleischer | |
| 9,190,217 B2 | 11/2015 | Snyder et al. | |
| 9,236,197 B2 | 1/2016 | Dai et al. | |
| 2011/0051316 A1* | 3/2011 | Liu | B82Y 30/00 361/502 |
| 2011/0304964 A1* | 12/2011 | Fleischer | B82Y 30/00 361/679.01 |
| 2013/0130049 A1 | 5/2013 | Moilanen et al. | |
| 2013/0302697 A1* | 11/2013 | Wang | B82Y 30/00 429/300 |
| 2013/0335884 A1 | 12/2013 | Gubin et al. | |
| 2014/0030590 A1* | 1/2014 | Wang | H01B 1/04 429/211 |
| 2014/0326600 A1* | 11/2014 | Li | B82Y 40/00 204/403.14 |
| 2014/0330100 A1* | 11/2014 | Li | B82Y 40/00 600/345 |
| 2015/0009605 A1 | 1/2015 | Dumas et al. | |
| 2015/0085423 A1 | 3/2015 | Ciocanel et al. | |
| 2015/0093629 A1 | 4/2015 | Sayre et al. | |
| 2015/0162140 A1 | 6/2015 | Hucker et al. | |
| 2015/0249362 A1 | 9/2015 | Bridgelall et al. | |
| 2015/0287543 A1 | 10/2015 | Aksay et al. | |
| 2015/0340169 A1 | 11/2015 | Qiu et al. | |
| 2016/0083872 A1 | 3/2016 | Zhang et al. | |

OTHER PUBLICATIONS

Qin, Zongyi et al. "Polyaniline/multi-walled carbon nanotube composites with core-shell structures as supercapacitor electrode materials," Electrochimica Acta 55, Apr. 2010, pp. 3904-3908.

Wang, Hualan et al. "A nanostructured graphene/polyaniline hybrid material for super capacitors, Nanoscale 2:2164," Nanoscale, 2010, 2, pp. 2164-2170.

Benson, Jim et al. "Multifunctional CNT-Polymer Composites for Ultra-Tough Structural Super capacitors and Desalination Devices," Advanced Materials 25,45 (2013); pp. 6625-6632.

Wang, K., et al. "High-Performance Two-Ply Yarn Supercapacitors Based on Carbon Nanotubes and Polyaniline Nanowire Arrays," Advanced Materials 25.10 (2013); pp. 1494-1498.

Shirshova, N. et al. "Multifunctional structural energy storage composite supercapacitors," Faraday discussions 172 (2014) pp. 81-103.

Singh, Pramod Kumar et al. "Ionic liquid-solid polymer electrolyte blends for supercapacitor applications," Polymer Bulletin, Aug. 13, 2015.

* cited by examiner

ENHANCED STRUCTURAL SUPERCAPACITORS

FIELD OF THE INVENTION

This disclosure relates to structural supercapacitors having high energy storage and high mechanical characteristics. More particularly, this disclosure relates to structural supercapacitors with carbon fiber electrodes containing carbon nanotubes, redox-active surface functionalization, and/or conducting polymers.

BACKGROUND OF THE INVENTION

Common types of energy storage devices include batteries and capacitors. Batteries use chemical reactions and traditional capacitors use the physical separation of electrical charges to store energy. In contrast, supercapacitors are high-capacity capacitors that can accept and send charge much faster than batteries and can store much more energy per unit volume than a traditional capacitor.

The structure of a typical supercapacitor includes a separator sandwiched between two electrodes and a liquid electrolyte ionically connecting both electrodes. Although supercapacitors containing a liquid electrolyte have excellent energy storage properties, such supercapacitors lack sufficient mechanical properties. Accordingly, traditional supercapacitors require a structural casing or a separate structural support to provide mechanical characteristics.

SUMMARY OF THE INVENTION

Unlike traditional supercapacitors, which are only used for providing energy, structural supercapacitors are used for providing energy and structural support. As stated above, most energy storage devices require a separate structural component to provide the necessary mechanical characteristics. Accordingly, these combined systems (i.e., energy device and a separate structural component) can have a large volume and/or mass. Applicants have discovered an integrated energy and structural system that uses the same material composite for both energy storage and structural support. Such an integrated system can have a smaller volume and/or mass when compared to a combination of corresponding mono-functional elements.

Since traditional methods of increasing capacitance intuitively have the effect of decreasing structural integrity (and vice versa), developing an integrated structural supercapacitor presents the challenge of balancing both energy storage and structural integrity. Applicants have developed a structural supercapacitor that combines both energy storage and structural integrity into a single functional unit. Specifically, Applicants have discovered structural supercapacitors and electrodes (and methods of making these supercapacitors and electrodes) that exhibit increased energy storage (e.g., capacitance) and mechanical characteristics relative to the state-of-the-art structural supercapacitors. Structural energy storage devices, and in particular structural supercapacitors, are a relatively new field of research, and much of the work in structural energy storage has focused on lithium-ion batteries. Some have incorporated commercial, prismatic, lithium-ion battery cells into structural components, or have reinforced solid-state lithium cells with high-strength backing such as carbon fiber reinforced plastic.

In contrast to previous research, Applicants have developed a structural supercapacitor and method for making a structural supercapacitor that can include a solid electrolyte and electrodes comprising carbon fiber for structural integrity, carbon nanotubes for increased surface area and increased capacitance, surface functionalized redox-active moieties for increased capacitance, and/or a conducting polymer for additional capacitance. In some embodiments, the structural supercapacitors are all-solid-state structural supercapacitors. Electrodes and structural supercapacitors described herein may be particularly useful in applications such as communication satellites, spacecraft, ground vehicles, and unmanned aerial vehicles (UAV). By incorporating a structural supercapacitor into a wing or fuselage of a UAV, for example, flight endurance time may increase due to the interdependence of the subsystem weights, amount of available energy, and flight endurance.

Some embodiments include a method of making an electrode for a structural supercapacitor. The method can include depositing carbon nanotubes on a carbon fiber sheet, functionalizing a surface of the carbon fiber sheet with a redox-active species, and depositing a conducting polymer on the carbon fiber sheet. In some embodiments, the carbon nanotubes can be deposited on the carbon fiber sheet before performing the surface functionalization with the redox-active species. In some embodiments, the conducting polymer can be deposited on the carbon fiber sheet after the surface functionalization with the redox-active species is performed. In some embodiments, the carbon nanotubes can be deposited on the carbon fiber sheet by chemical vapor deposition, aqueous deposition, or non-aqueous deposition. In some embodiments, the surface functionalization with a redox-active species is performed electrochemically, chemically, or by vapor deposition. In some embodiments, depositing a conducting polymer on the carbon fiber sheet includes depositing a liquid monomer on the carbon fiber sheet and polymerizing the liquid monomer to form the conducting polymer. In some embodiments, the monomer includes aniline and the conducting polymer includes polyaniline. In some embodiments, the weight of the carbon nanotubes amounts to 10-25% of the weight of the carbon fiber sheet. In some embodiments, the redox-active species includes aminobenzoic acid. In some embodiments, the weight of the conducting polymer amounts to 15-35% of the weight of the carbon fiber sheet. In some embodiments, the carbon fiber sheet is a woven carbon fiber sheet.

Some embodiments include an electrode for a structural supercapacitor. The electrode can include a carbon fiber sheet that includes carbon nanotubes, redox-active moieties, and a conducting polymer. In some embodiments, the redox-active moieties are on the carbon nanotubes. In some embodiments, the conducting polymer is on the redox-active moieties. In some embodiments, the conducting polymer is polyaniline. In some embodiments, the weight of the conducting polymer amounts to 15-35% of the weight of the carbon fiber sheet. In some embodiments, the weight of the carbon nanotubes amounts to 10-25% of the weight of the carbon fiber sheet. In some embodiments, the redox-active moieties comprise aminobenzoate moieties.

Some embodiments include a structural supercapacitor. The structural supercapacitor can include at least two carbon fiber sheets that include carbon nanotubes, redox-active moieties, and a conducting polymer; and a solid electrolyte. In some embodiments, the structural supercapacitor includes at least one separator between a first carbon fiber sheet and a second carbon fiber sheet. In some embodiments, the separator includes glass fiber. In some embodiments, the redox-active moieties are on the carbon nanotubes. In some embodiments, the conducting polymer is on the redox-active moieties. In some embodiments, the conducting polymer is polyaniline. In some embodiments, the weight of the conducting polymer amounts to 15-35% of the weight of the carbon fiber sheet. In some embodiments, the weight of carbon nanotubes amounts to 10-25% of the weight of the carbon fiber sheet. In some embodiments, the redox-active moieties include aminobenzoate moieties. In some embodiments, the solid electrolyte is a polymer electrolyte. In some embodiments, the polymer electrolyte is a poly(ethylene glycol)-based polymer electrolyte. In some embodiments, the polymer electrolyte includes a copolymer of methoxy polyethylene glycol monoacrylate and ethoxylated (4) pentaerythritol tetraacrylate containing lithium triflate as the ionic component. In some embodiments, at least a portion of the solid electrolyte is between the at least two carbon fiber sheets. In some embodiments, at least one separator is between a first carbon fiber sheet and a second carbon fiber sheet. In some embodiments, the specific capacitance of the structural supercapacitor is at least 100 mF/g. In some embodiments, the energy density of the structural supercapacitor is at least 15 mWh/kg. In some embodiments, the flexural strength of the structural supercapacitor is at least 20 MPa according to ASTM D790. In some embodiments, the flexural modulus of the structural supercapacitor is at least 2.5 GPa according to ASTM D790. In some embodiments, the structural supercapacitor is an all-solid-state structural supercapacitor.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Additional advantages will be readily apparent to those skilled in the art from the following detailed description. The examples and descriptions herein are to be regarded as illustrative in nature and not restrictive.

BRIEF DESCRIPTION OF THE DRAWINGS

Exemplary embodiments are described with reference to the accompanying figures, in which.

DETAILED DESCRIPTION OF THE INVENTION

Figure 1:
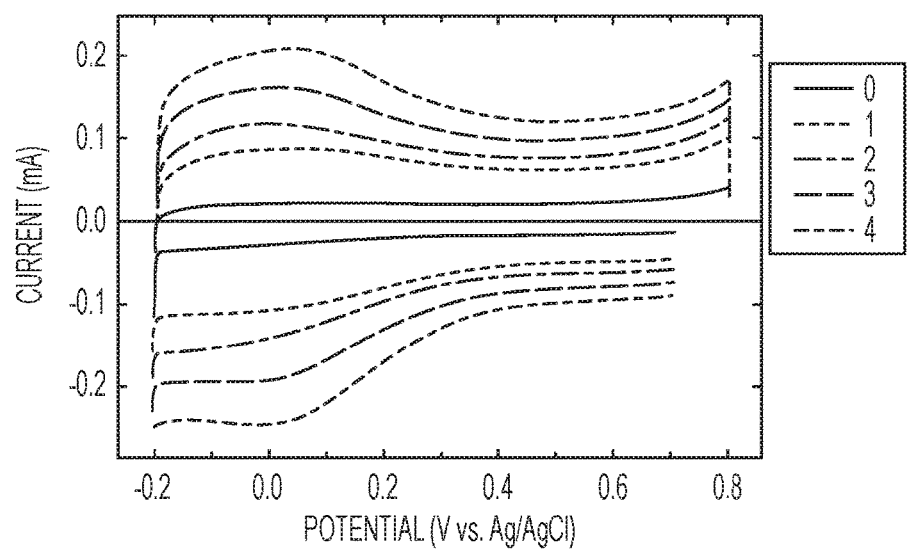
FIG. 1 illustrates cyclic voltammetry (CV) results of multiwall carbon nanotube (MWCNT)-impregnated carbon fiber electrodes compared to unmodified carbon fiber electrodes.

Unlike traditional supercapacitors, which are only used for providing energy, Applicants have discovered an integrated energy and structural system that uses the same material composite for both energy storage and structural support. Specifically, Applicants have developed a structural supercapacitor and method for making a structural supercapacitor that can include a solid electrolyte and electrodes comprising carbon fiber for structural integrity, carbon nanotubes for increased surface area, surface functionalization with a redox-active species for increased capacitance, and/or a conducting polymer for additional capacitance. Accordingly, such an integrated system can have a smaller volume and/or mass when compared to a combination of corresponding mono-functional elements. In addition, not only can the supercapacitors described herein have high structural integrity, but they can also have high energy storage capacity.

Described herein are examples of electrodes and structural supercapacitors and methods for making the electrodes and supercapacitors. In some embodiments, carbon nanotubes can be impregnated into carbon fiber to increase surface area and capacitance. In some embodiments, surface functionalization can be performed on the surface of the carbon fiber or the carbon fiber impregnated with carbon nanotubes to provide additional capacitance in the form of pseudo-capacitance. In some embodiments, a conducting polymer can be incorporated on the carbon fiber, the carbon fiber with carbon nanotubes, or the carbon fiber with nanotubes and surface functionalization to provide additional capacitance and potential structural integrity.

As described in more detail below, Applicants have discovered an electrode and an integrated structural supercapacitor and method of making an electrode and integrated structural supercapacitor using components that yielded acceptable capacitance and structural properties.

Modification Methods and Techniques for Electrodes

In some embodiments, the electrodes can first be fabricated and characterized before being incorporated into a structural supercapacitor. A method of making an electrode disclosed herein can include depositing carbon nanotubes on a carbon fiber sheet; functionalizing a surface of the carbon fiber sheet with a redox-active species; and/or depositing a conducting polymer on the carbon fiber sheet. The following sections describe various materials and steps that can be included in making an electrode for a structural supercapacitor.

Carbon Fiber Sheets: In some embodiments, carbon fiber sheets can be used to form the base of the electrodes. The carbon fiber sheets can be, for example, those used in carbon fiber reinforced plastic (i.e., CFRP). In some embodiments, the carbon fiber sheet can be a woven carbon fiber sheet (e.g., "1K plain weave ultralight carbon fiber fabric" (Fibreglast)). Using carbon fiber sheets as the base of an electrode can be much simpler for supercapacitors than batteries because supercapacitors are commonly symmetric (i.e., the anode and cathode can be identical in composition) and carbon fiber can be used as both a current collector and an active electrode because carbon fiber has a high electronic conductivity and surface area (both important for electrochemical double-layer charging inherent to supercapacitors). In addition, a carbon fiber sheet can naturally increase the surface area of the electrode due to its porosity, thereby increasing the capacitance of the system at the same time. Thus, carbon fiber can provide more surface area than a flat plate of the same size and shape that might be used in a traditional capacitor.

In some embodiments, the carbon fiber sheets can be plasma treated. The plasma treatment can include being treated with oxygen plasma in a Harrick Plasma Cleaner. In some embodiments, the plasma treatment is for at least 2 minutes, at least 5 minutes, at least 10 minutes, or at least 20 minutes. In some embodiments, the plasma treatment is for 2-20 minutes, 5-15 minutes, or 10 minutes.

Carbon Nanotube Deposition: In some embodiments, carbon nanotubes (e.g., multi-wall carbon nanotubes (MW-CNT)) can be used to further increase the surface area of the electrode. Just as the capacitance of a traditional capacitor increases as the surface area of the conductive plates increase, so too can the capacitance of a structural supercapacitor. As such, the increased surface area from the carbon nanotubes can provide more capacitance for the electrode, and thus any subsequent structural supercapacitor. In some embodiments, the carbon nanotubes can be COOH-functionalized multiwall carbon nanotubes by Nanolab, Inc. Carbon nanotube deposition can be added to any variation of the electrode, including the carbon fiber sheet itself, the surface functionalized-modified carbon fiber sheet, or the surface functionalized/conducting polymer-modified carbon fiber sheet.

Numerous methods can be used to impregnate the carbon fiber with carbon nanotubes. In some embodiments, carbon nanotubes can be deposited onto the carbon fiber using chemical vapor deposition, aqueous deposition, and/or non-aqueous deposition. In embodiments where the carbon nanotubes are deposited using aqueous deposition, the carbon nanotubes can be mixed with water and placed in a sonicating bath to create a suspension. The concentration of the suspension can be about 1-5 mg/mL, about 2-4 mg/mL, about 3-4 mg/mL, or about 3.4 mg/mL. In some embodiments, the carbon nanotubes and water can be placed in the sonicating bath for at least 1 hour, at least 2 hours, at least 3 hours, at least 4 hours, or at least 5 hours. In other embodiments, the carbon nanotube suspension can be deposited on the carbon fiber in amounts of 0.1-2, 0.5-1.5, or 1 mL per square inch and allow for the water to evaporate. In some embodiments, the water is allowed to evaporate for at least 2 hours, at least 4 hours, at least 6 hours, at least 8 hours, at least 10 hours, or overnight.

In some embodiments, the weight of carbon nanotubes amounts to about 10-25%, about 15-20%, or about 16-17% of the carbon fiber weight in the electrode. In some embodiments, the weight of carbon nanotubes amounts to about 16% or about 17% of the carbon fiber weight of the electrode. These percentages are relative to the amount of plain carbon fiber (i.e., the initial weight of the carbon fiber before anything is added). At about 16-17%, the nanotubes can begin to visibly fill up the void space between carbon fibers which can affect the structural aspect of a stacked supercapacitor. In some embodiments, the weight of carbon nanotubes is about 5-15 wt %, about 8-14 wt %, or about 11-12 wt % of the entire electrode. In some embodiments, the carbon nanotubes are about 11 wt % or 12 wt % of the entire electrode.

Surface Functionalization: In some embodiments, a surface of the carbon fiber sheet can be functionalized using a redox-active species such as a carboxylate anion. Surface functionalization can include the covalent grafting of a redox-active species to a surface of the electrode, thereby leaving redox-active moieties covalently attached to the surface of the electrode. Surface functionalization can enhance the performance of the electrode and structural supercapacitor using pseudo-capacitance. Accordingly, surface functionalization can result in better wettability by the electrolyte and can impart the electrode with pseudocapacitance from the added redox reaction. In some embodiments, the redox-active moieties left by surface functionalization can store more charge, thereby increasing the overall capacitance of the structural supercapacitor.

Surface functionalization can be performed via chemical reaction, electrochemical reaction, physical vapor deposition, or chemical vapor deposition. Surface functionalization can be added to any variation of the electrode, including the carbon fiber sheet itself, the carbon nanotube-modified carbon fiber sheet, and the carbon nanotube/conducting polymer-modified carbon fiber sheet. In some embodiments, surface functionalization is performed using electro-oxidation in a redox-active species. In some embodiments, surface functionalization occurs before carbon nanotubes are deposited on the carbon fiber sheet. In other embodiments, surface functionalization occurs after carbon nanotubes are deposited on the carbon fiber sheet. If surface functionalization occurs after carbon nanotubes are deposited on the carbon fiber sheet, the redox-active moieties can be attached to the carbon nanotube surfaces as well as the carbon fiber sheet.

In some embodiments, the redox-active species can include aminobenzoic acid (ABA) (e.g., 4-aminobenzoic acid), ABSA, ABPA, nitrobenzene, anthraquinones, benzoquinones, naphthoquinones, aryl azo compounds, organometallic compounds, and/or others. The moieties left by surface functionalization can be the corresponding redox-active moiety of the redox-active species used. For example, if aminobenoic acid is used as the redox-active species, aminobenzoate moieties will be left on the surface of the carbon fiber sheet. In embodiments where ABA is added, the surface functionalization can be performed using an argon-purged aqueous solution containing 7 mM 4-amino-benzoic acid and 100 mM potassium chloride (with 10 cyclic voltammetry cycles at 10 mV/s from +0.5 to +1.2 V vs. Ag/AgCl).

Conducting Polymer Deposition: In some embodiments, a conducting polymer can be deposited on the carbon fiber sheet. The conducting polymer can increase the capacitance of the resulting electrode. Conducting polymers can be considered pseudo-capacitive materials because they behave not like a battery and not like a capacitor, but somewhere in between. Pseudo-capacitive materials like conducting polymers undergo redox reactions on the surface of the material.

Deposition of a conducting polymer can be accomplished in a variety of ways as disclosed herein. In some embodiments, the conducting polymer itself can be deposited on an electrode surface by spreading a suspension or solution of the polymer onto the electrode and allowing the solvent to evaporate. In some embodiments, a conducting polymer can be electrochemically synthesized and simultaneously deposited on an electrode surface through the electro-oxidation of monomers. For example, a liquid monomer can be deposited on a carbon fiber sheet and then polymerized to form the conducting polymer. In some embodiments, the conducting polymer can be deposited onto an electrode by electro-oxidation using cyclic voltammetry in a solution comprising a monomer. In some embodiments, the monomer can include aniline, pyrrole, thiophene, benzene, and derivatives or chemical analogs thereof. In some embodiments, the conducting polymer can be polyaniline, polypyrrole, polythiophene, poly(p-phenylene), and derivatives or chemical analogs thereof. When the conducting polymer is polyaniline, electro-oxidation can be performed using cyclic voltammetry in an argon-purged aqueous solution containing 0.1 M aniline and 1 M $H_2SO_4$ (one or five cyclic voltammetry cycles at 10 mV/s from +0.0 to +1.1 V vs. Ag/AgCl). In some embodiments, the conducting polymer can be oxidized, giving the conducting polymer a positive charge. In such cases, ions can aggregate near the surface of the conducting polymer to balance the charge of the material.

The conducting polymer can be added to any variation of electrode, including the carbon fiber sheet itself, the carbon nanotube-modified carbon fiber sheet, and the carbon nanotube/surface functionalized-modified carbon fiber sheet. In some embodiments, the conducting polymer can be deposited before carbon nanotubes are deposited on the carbon fiber sheet. In some embodiments, the conducting polymer can be deposited after carbon nanotubes are deposited on the carbon fiber sheet. In some embodiments, the conducting polymer can be deposited after surface functionalization has occurred. In some embodiments, the conducting polymer can be deposited before surface functionalization has occurred. In some embodiments, the conducting polymer can be deposited after carbon nanotubes have been deposited on the carbon fiber sheet and after surface functionalization has occurred. In some embodiments, the conducting polymer can be deposited on the carbon fiber sheet before the carbon nanotubes have been deposited and before surface functionalization. In some embodiments, the conducting polymer is added after carbon nanotubes are added to the carbon fiber sheet but before surface functionalization. In some embodiments, the conducting polymer is added after surface functionalization but before carbon nanotube deposition. In some embodiments, carbon nanotubes are deposited on a carbon fiber sheet, the surface of the carbon fiber sheet is functionalized after carbon nanotube deposition, and a conducting polymer is deposited after surface functionalization.

In some embodiments, the weight of conducting polymer amounts to about 15-35%, about 20-30%, about 24-26%, or about 25% of the carbon fiber weight in the electrode. These percentages are relative to the amount of plain carbon fiber (i.e., the initial weight of the carbon fiber before anything is added). At about 25%, the conducting polymer can begin to visibly grow outside of the sheet which can adversely affect the structural aspect of a stacked structural supercapacitor. In some embodiments, the weight of conducting polymer is about 10-25 wt %, about 15-20 wt %, about 16-18 wt %, about 17-18 wt %, or about 17.6 wt % of the entire electrode.

Fabrication Sequencing and Exclusion of Components: There are numerous ways to combine the components described herein (e.g., carbon fiber, carbon nanotubes, surface functionalization, conducting polymer) to form an electrode. In some embodiments, all components may be included, whereas in other embodiments, one or more components may be excluded.

For example, one embodiment may include all components fabricated in the order: carbon fiber, carbon nanotubes, surface functionalization, conducting polymer. Another embodiment can fabricate the electrode with the components in a different order, such as: (1) carbon fiber, carbon nanotubes, conducting polymer, surface functionalization; (2) carbon fiber, conducting polymer, surface functionalization, carbon nanotubes; (3) carbon fiber, surface functionalization, conducting polymer, carbon nanotubes; and/or (4) carbon fiber, conducting polymer, carbon nanotubes, surface functionalization.

Further, some embodiments might exclude one component. For example, some embodiments might exclude the conducting polymer, and fabricate an electrode comprising the carbon fiber, carbon nanotubes, and surface functionalization. Other embodiments might exclude the surface functionalization, resulting in an electrode comprising carbon fiber, carbon nanotubes, and conducting polymer. Other embodiments can exclude the carbon nanotubes.

In other embodiments, more than one component can be excluded from electrode fabrication. Some embodiments might not use the carbon nanotubes or conducting polymer, and fabricate an electrode comprising carbon fiber and surface functionalization. Other embodiments might fabricate an electrode comprising carbon nanotubes and surface functionalization, and other embodiments might fabricate an electrode comprising carbon nanotubes and conducting polymer.

The specific electrode components and fabrication sequencing explored above is not intended to be exhaustive. A person of ordinary skill in the art can readily identify other component and sequencing combinations of which are meant to be covered by the disclosure herein.

Modification Methods and Techniques for Structural Supercapacitors

Any of the electrodes previously disclosed herein can be incorporated into a structural supercapacitor. A structural supercapacitor can include at least two electrodes and at least one separator. In some embodiments, the structural supercapacitor can include a solid electrolyte. For example, a structural supercapacitor can include at least two carbon fiber sheets containing carbon nanotubes, redox-active moieties, and/or a conducting polymer; and a solid electrolyte. In some embodiments, at least a portion of the solid electrolyte is between at least two electrodes. In other embodiments, the solid electrolyte is between at least two electrodes.

Separator: In some embodiments, the structural supercapacitor can include at least one separator between two electrodes. In some embodiments, at least one separator can be an ion-permeable membrane. In some embodiments, the separator can include glass fiber or aramid (Kevlar®) fiber. In some embodiments, at least one separator is between two electrodes. In some embodiments, the structural supercapacitor can be in the order of a first electrode, a separator(s), and a second electrode, wherein the electrodes and separator(s) are interspersed with a solid electrolyte. In other embodiments, the electrolyte is added after two electrodes and at least one separator are stacked together. In other embodiments, the electrolyte can be added the electrodes and the separator(s) individually before they are stacked. In some embodiments, sheets of carbon fiber fabric and glass fiber fabric can be used as the electrodes and separators, respectively. Some embodiments can use electrodes and separators of rectangular, circular, triangular, or other geometric shapes. The initial 2D shape of the components can be trivial and may be limited by the ability to maintain the fiber weave of the carbon or glass fiber fabric. In some embodiments, the electrodes and separators can be oriented with the fibers parallel to the edge of the sheet. In other embodiments, the electrodes and separators can be oriented with the fibers at a 45° angle to the edge of the sheet. Some embodiments layer the electrodes and separators in alternating stacks. In other embodiments, four layers can be stacked in the order: electrode (parallel orientation), separator (45° orientation), separator (parallel orientation), and electrode (45° orientation).

Solid Electrolyte: In traditional energy storage devices, including traditional capacitors and supercapacitors, liquid electrolytes provide a higher capacitance. As such, using a solid electrolyte can degrade performance in such a system most likely because the solid electrolyte cannot get into all of the microscopic crevices and voids (as a liquid electrolyte can) to take advantage of all the surface area of the electrodes and modified electrodes. However, a liquid electrolyte can degrade structural integrity and has the potential to leak and potentially damage or destroy a system that includes the capacitor. Due to the need for structural integrity in a structural supercapacitor and to minimize electrolyte leakage, Applicants have discovered a way to incorporate a solid electrolyte into the structural supercapacitor to impart the device with structural integrity.

The solid electrolyte can be added in various ways. A solid electrolyte can infiltrate the separator layer(s) and the electrodes rather than being a separate layer itself. For example, the solid electrolyte can act like a liquid electrolyte and get into a vast majority of the crevices and voids of the electrodes and/or separators. Specifically, the electrolyte can be added in a liquid or gel form, which can then be cured to form a solid. In other embodiments, the electrolyte can be added the electrodes and the separator(s) individually before they are stacked. The solid electrolyte can be a polymer electrolyte. The polymer electrolyte can be a mixture of a salt and a polymer. The salt can be any metal salt (e.g., lithium chloride, sodium chloride, or lithium trifluoromethansulfonate), and it can be a molten salt or ionic liquid such as 1-ethyl-3-methylimidazolium bis(trifluoromethanesulfonyl)imide or 1-ethyl-3-methylimidazolium trifluoromethanesulfonate. The polymer can include or can be a copolymer of multiple of the following: vinyl ester poly(ethylene glycol) derivatives [i.e. poly(ethylene glycol) oligomers with one to four vinyl ester groups]; poly(bisphenol A diglycidyl ether); poly(N,N,N',N'-tetraglycidyl-m-xylenediamine); poly(ethylene glycol); and/or poly(ethylene oxide). In some embodiments, the polymer electrolyte can be a poly(ethylene glycol)-based polymer electrolyte. In some embodiments, the polymer electrolyte can include a copolymer of methoxy polyethylene glycol monoacrylate and ethoxylated (4) pentaerythritol tetraacrylte containing lithium triflate as the ionic component. In some embodiments, the polymer electrolyte is non-acidic. Other examples of polymers for polymer electrolytes and solid electrolytes and methods of adding the solid electrolytes can be found in Snyder, J. F., Wetzel, E. D. & Watson, C. M. Improving multifunctional behavior in structural electrolytes through copolymerization of structure- and conductivity-promoting monomers. *Polymer (Guild)*. 50, 4906-4916 (2009) and Snyder, J. F., Carter, R. H. & Wetzel, E. D. Electrochemical and mechanical behavior in mechanically robust solid polymer electrolytes for use in multifunctional structural batteries. *Chem. Mater.* 19, 3792-3801 (2007) which are hereby both incorporated by reference in their entirety.

In some embodiments, the polymer electrolyte can start out as a liquid monomer that is added to the electrode/separator structure. After the liquid infiltrates the structure, a polymerization reaction can be initiated to form the solid polymer electrolyte. Accordingly, the electrode/separator structure may be considered to be integrally coated with a solid electrolyte.

In some embodiments, the polymer electrolyte can be fabricated by mixing an initiator with a monomer-salt stock solution. For example, a polymer electrolyte can be fabricated by mixing 1.5 wt % Luperox® DI with a monomer-salt stock solution with a stir bar for 5 minutes. In some embodiments, the polymer electrolyte can be poured onto the electrode/separator stack. In some embodiments, the electrode/separator stack can be placed between layers of nylon peel-ply, fluoropolymer sheet, and/or flat glass plates and weights (e.g., corresponding to 0.3 psi (relative to the area of the electrode/separator sheets)) can be placed on top. In some embodiments, the structure can be set by placing the entire assembly into an oven at 140° for four hours. Following cool-down, the nylon and fluoropolymer sheets can be peeled off. In addition, the resultant solid composite can be placed in an oven at 160° for one hour to complete polymerization and drive off residual vapor and moisture.

The solid polymer electrolyte can be added to the electrodes and separators by mixing the corresponding monomer with a salt and initiator and spreading or depositing this mixture throughout the porous structure of the electrodes and separators. The entire structure can then be heated to the temperature necessary to activate the initiator. Alternatively, the solid polymer electrolyte can be added to the electrodes and separators by spreading or depositing a solution of the polymer and salt throughout the porous structures of the electrodes and separators. The solvent can then be allowed to evaporate at room temperature or an elevated temperature. In both cases, the solid polymer electrolyte can infiltrate the voids within the fibrous or woven structure of the electrodes and separators.

The solid electrolyte can be 20-80%, 30-70%, 35-65%, or 40-60% by weight of the entire supercapacitor structure. The electrodes can be 10-55%, 15-50%, or 20-45% by weight of the entire supercapacitor structure. The separators can be 5-40%, 7.5-35%, or 10-30% by weight of the entire supercapacitor structure.

Liquid Electrolyte: In some embodiments, the structural supercapacitors can also include a liquid electrolyte. In some embodiments, the liquid electrolyte can be an ionic liquid. In some embodiments, the liquid electrolyte can be added when the solid electrolyte is added to the electrode/separator stack. In some embodiments, the liquid electrolyte can be deposited onto a solid-state supercapacitor and allowed to soak. In some embodiments, the ionic liquid can be added in the amount of about 5-90%, about 10-80, about 20-70%, about 30-60%, about 30-50%, about 35-45%, or about 40% of the total cell weight. In some embodiments, ionic liquid can be added to the supercapacitor cell no more than 40%, 30%, 20%, 15%, 10%, 5%, or 2% of the total cell weight. In some embodiments, the liquid electrolyte can be potassium chloride aqueous solution, other aqueous salt solutions, EMI-TFSI, or other ionic liquids containing 1-ethyl-3-methylimidazolium cation.

Fabrication Sequencing: The structural supercapacitors described herein can be electrically stacked in series and/or in parallel. The structural supercapacitors described herein can be mechanically layered in series and/or in parallel. In addition, one electrode for a first supercapacitor can be used as an electrode for a second supercapacitor in series and/or in parallel. The specific supercapacitor components and fabrication sequencing explored above is not intended to be exhaustive. A person having ordinary skill in the art can readily identify other component and sequencing combinations of which are meant to be covered by the disclosure herein.

Properties: The Example sections explain how specific capacitance, energy density, flexural strength, and flexural modulus are calculated. However, the structural supercapacitors disclosed herein can have a specific capacitance of at least 50 mF/g, at least 75 mF/g, at least 100 mF/g, at least 125 mF/g, at least 150 mF/g, at least 175 mF/g, and at least 200 mF/g. In some embodiments, the structural supercapacitors disclosed herein can have a specific capacitance between 50-500 mF/g, 100-400 mF/g, or 125-250 mF/g. The structural supercapacitors disclosed herein can have an energy density of at least 10, at least 15, at least 20, at least 25, at least 50, at least 75, or at least 100 mWh/kg. In some embodiments, the structural supercapacitors disclosed herein can have an energy density between 5-100, 10-75, or 15-50 mWh/kg. The structural supercapacitors disclosed herein can have a flexural strength of at least 10, at least 15, at least 20, at least 25, at least 30, at least 50, or at least 100 MPa. In some embodiments, the structural supercapacitors disclosed herein can have a flexural strength between 5-100, 10-50, or 20-50 MPa. The structural supercapacitors disclosed herein can have a flexural modulus of at least 0.5, at least 1, at least 1.5, at least 2, at least 2.5, at least 3, at least 3.5, at least 4, at least 5, or at least 10 GPa. In some embodiments, the structural supercapacitors disclosed herein can have a flexural modulus between 0.5-10, 1-8, or 2.5-5 GPa.

EXAMPLES

The following are example supercapacitors and tests of example supercapacitors conducted by Applicants.

Materials Used: Applicants used "1K" plain weave ultralight carbon fiber fabric (Fibreglast) for all example electrodes. In addition, any conductive carbon paint used was from SPI Supplies. Furthermore, any potassium chloride (KCl), 4-aminobenzoic acid (ABA), aniline, lithium trifluoromethanesulfonate (triflate), tert-butyl peroxide (Luperox® DI initiator), and 1-ethyl-3-methylimidazolium bis(trifluoromethylsulfonyl)imide (EMI-TSFI) used were from Sigma-Aldrich. COOH-functionalized multiwall carbon nanotubes (NanoLab Inc.) were mixed with water and placed in a sonicating bath for 3 hours to create a suspension with 3.4 mg/mL concentration. "4 oz" glass fiber fabric (Fibreglast) was used as the separator in structural supercapacitors. Nylon peel-ply sheets (Fibreglast) were used for supercapacitor fabrication. Methoxy polyethylene glycol (500) monoacrylate (monomer "CD553") and alkoxylated pentaerythritol tetraacryulate (monomer "SR494") were used as received from Sartomer. CD553, SR494 and lithium triflate were mixed with a stir bar overnight in the weight ratio 2.45:8.85:1 to create a monomer-salt stock solution.

Electrode Testing

Electrode Preparation, Testing, and Modification with Liquid Electrolyte:

5/16"-diameter disks were punched out of carbon fiber fabric, weighed, and attached to glassy carbon electrodes (Bioanalytical Systems) using conductive carbon paint (SPI Supplies). The carbon paint was allowed to dry overnight.

Electrochemical tests on these carbon fiber disk electrodes were performed using a Pine potentiostat and AfterMath software. Electrolyte solutions were purged with bubbling argon gas prior to electrochemical testing and a continuous argon blanket was supplied during electrochemical testing. Each electrode was fabricated and electrochemically tested at room temperature in triplicate. Each electrode was subjected to electrochemical characterization before modification and between each modification step (carbon nanotube impregnation, surface functionalization, conducting polymer deposition).

The electrolyte for characterization was an aqueous solution of 1M KCl, and the reference and counter electrodes were Ag/AgCl (Bioanalytical Systems) and a platinum coil, respectively. Electrochemical characterization consisted of cyclic voltammetry (CV) at 200, 100, 50, 10, 5, and 1 mV/s over the range of −0.2 to +0.8 V vs. Ag/AgCl. Cycles were repeated 5-20 times until stable values were achieved. Capacitance was calculated by integrating the current-time curve for the reductive (negative current) portion of the last cycle. Specific capacitance of the electrodes is relative to the total electrode weight.

After the first round of CV testing, each electrode was subjected to oxygen plasma for 10 minutes in a Harrick Plasma Cleaner. The plasma-treated electrodes were impregnated with multiwall carbon nanotubes by depositing 50 μL of the MWCNT suspension onto the fabric disk and allowing the water to evaporate overnight.

Electrochemical surface functionalization of plasma-treated disks or MWCNT-impregnated disks was performed by electro-oxidation via CV (10 cycles at 10 mV/s from +0.5 to +1.2V vs. Ag/AgCl) in an argon-purged aqueous solution comprising 7 mM 4-aminobenzoic acid (ABA) and 100 mM KCl.

Electrochemical synthesis and deposition of polyaniline onto ABA-functionalized disks or MWCNT-ABA-functionalized disks were performed by electro-oxidation via CV (one or five cycles at 10 mV/s from +0.0 to +1.1 V vs. Ag/AgCl) in an argon-purged aqueous solution containing 0.1 M aniline and 1 M $H_2SO_4$. After testing and characterization, the carbon fiber disks were removed from the glassy carbon, rinsed, dried, and weighed.

Electrode Results with Liquid Electrolyte: The modifications were initially characterized using three-electrode cells with a liquid electrolyte (aqueous potassium chloride solution). CV was used to quantify the specific capacitance at various rates relative to the total weight of the electrode. This allowed for comparison to other supercapacitor electrodes in liquid electrolyte. Although the observations of electrodes in liquid electrolyte may not directly translate to those of supercapacitors with solid polymer electrolytes, this can be a simple screening method that offers a good indication of the level of improvement that can be achieved by Applicants' structural supercapacitors.

MWCNT-impregnated electrode: CV (10 mV/s) results of MWCNT-impregnated carbon fiber electrodes compared to unmodified carbon fiber electrodes in 1M KCl electrolyte are shown in FIG. 1. The legend indicates the number of MWCNT depositions which corresponds to 50 µL suspension each. Each MWCNT deposition corresponded to about 4% MWCNT relative to the weight of the carbon fiber sheet. The shape of the curve for the unmodified electrode shows a mostly non-faradaic response, exhibiting double-layer charging on the carbon fiber surface. The shape of the CV curves for the MWCNT-modified fibers shows a mixture of faradaic and non-faradaic behavior. The faradaic portion, which is defined by redox peaks close to zero volts vs. the Ag/AgCl reference electrode is likely due to the redox reaction of the carboxylate groups that formed on the nanotubes during the manufacturer's chemical activation process. The addition of MWCNT to the carbon fiber electrodes resulted in a significant increase in the current, which rose in conjunction with the amount of MWCNT added.

Figure 2:
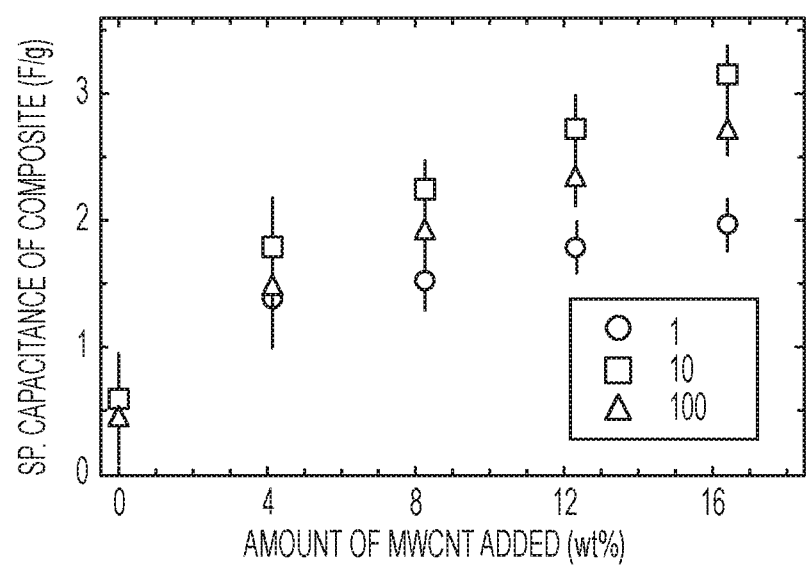
FIG. 2 illustrates specific capacitance of MWCNT-impregnated carbon fiber electrodes after increasing amounts of MWCNT deposition.

The specific capacitance values from these CVs are shown in FIG. 2 for a range of scan rates spanning two orders of magnitude, with the mass of the MWCNT included in the calculation of the overall mass. The specific capacitance values are relative to the total electrode weight (i.e., carbon fiber plus MWCNT) and are measured with CV experiments in 1M KCl electrolyte at the scan rate (in mV/s) indicated in the legend. Markers and error bars are the average and standard deviation, respectively, of measurements of three replicate electrodes. Based on FIG. 2, the addition of 16% MWCNT (relative to the weight of the carbon fiber sheet) achieved a six-fold increase in specific capacitance (up to 3.1 F/g at 10 mV/s). Diminishing returns were observed above this 16-17% loading. The nanotubes began to visibly fill up the void space between carbon fibers. Accordingly, the specific capacitance values were slightly dependent on the scan rate with the optimum capacitance achieved at 10 mV/s. Least squares linear fits of capacitance versus MWCNT weight revealed that the nanotubes alone possessed an average specific capacitance of 16 F/g. With more sophisticated deposition techniques, a nanotube loading of 16% or 17% (relative to the weight of the carbon fiber) can produce an electrode capacitance as high or greater than 60 F/g, which is competitive with state-of-the art supercapacitors.

Figure 3:
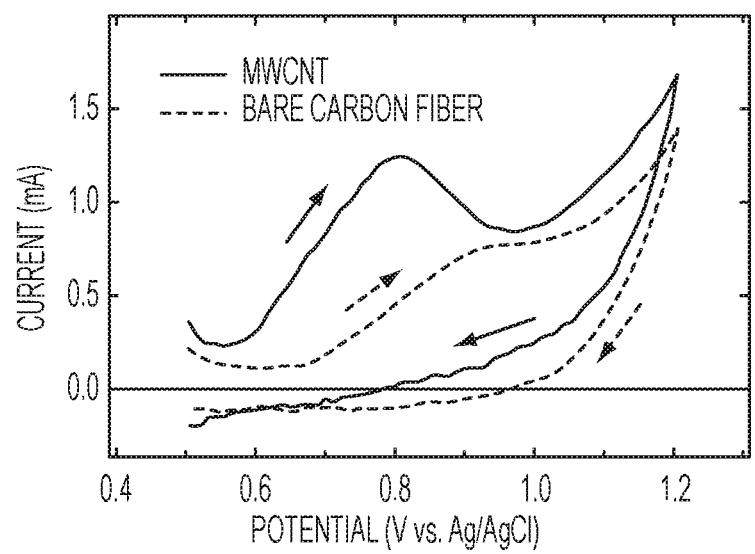
FIG. 3 illustrates the 4-aminobenzoic acid (ABA) functionalization of a bare carbon fiber electrode and a carbon fiber electrode with 17% MWCNT relative to the carbon fiber weight.

Surface Functionalized Electrode: Cyclic voltammetry was performed on the carbon fiber electrodes in an aqueous solution containing 7 mM ABA and 100 mM KCl. FIG. 3 illustrates the ABA CV (10 mV/s) surface functionalization of electrodes (first 10 cycles are shown) containing bare carbon fiber and carbon fiber with 17% MWCNT (relative to the carbon fiber weight) in an aqueous solution containing 7 mM ABA and 100 mM KCl. As shown in FIG. 3, subsequent cycles had significantly lower currents, which show that most of the functionalization occurred in the first cycle. For functionalization on the bare carbon fiber electrode, there is an oxidative CV peak around 0.9V vs. Ag/AgCl, which is in agreement with previous experiments on glassy carbon. The functionalization current was much higher with the MWCNT electrode most likely because of the higher surface area and higher amount of reaction sites. The oxidation peak was shifted to a lower potential (around 0.8 V vs. Ag/AgCl) which could be due to a difference in the reaction kinetics mass transfer limitations or local pH near the electrode surface.

Figure 4:
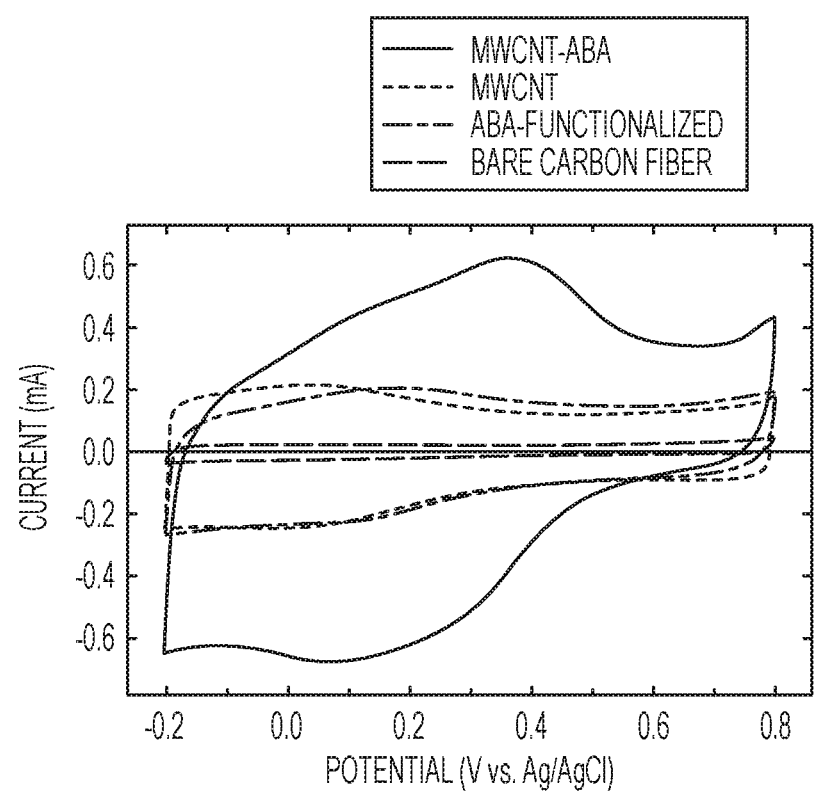
FIG. 4 illustrates the effect of MWCNT impregnation and ABA functionalization on CV of carbon fiber electrodes.

After the electrode was thoroughly rinsed in water to remove any unbonded ABA, it was placed in 1M KCl electrolyte for characterization. FIG. 4 illustrates the CV results at 10 mV/s for the functionalized carbon fiber compared to plain carbon fiber and MWCNT-impregnated (16% relative to the weight of the carbon fiber) carbon fiber. ABA functionalization had a similar quantitative effect as MWCNT impregnation, increasing the current significantly at all potentials. The shape of both CVs appear both non-faradaic and faradaic, with a broad peak-pair superimposed on the capacitive charge-discharge curve. The peak-pair for the ABA-functionalized electrode is centered around ~0.1 V vs. Ag/AgCl, slightly higher than the peak-pair of the MWCNT electrode. This may be due to a slight difference in the local pH or functional group coverage near the electrode surfaces, considering that the MWCNTs were chemically functionalized with —COOH groups and the carbon fibers were electrochemically functionalized with ABA (—NH—$C_6H_4$—COOH). As shown in FIG. 4, the combination of carbon nanotubes and ABA functionalization resulted in a greatly increased current. As shown in FIG. 4, the CV is dominated by pseudocapacitance, with a broad peak-pair around 0.3 V vs. Ag/AgCl. Thus, there was a synergistic effect achieved through combining the high surface area of MWCNT and the redox-active chemistry of ABA functionalization.

Figure 5A:
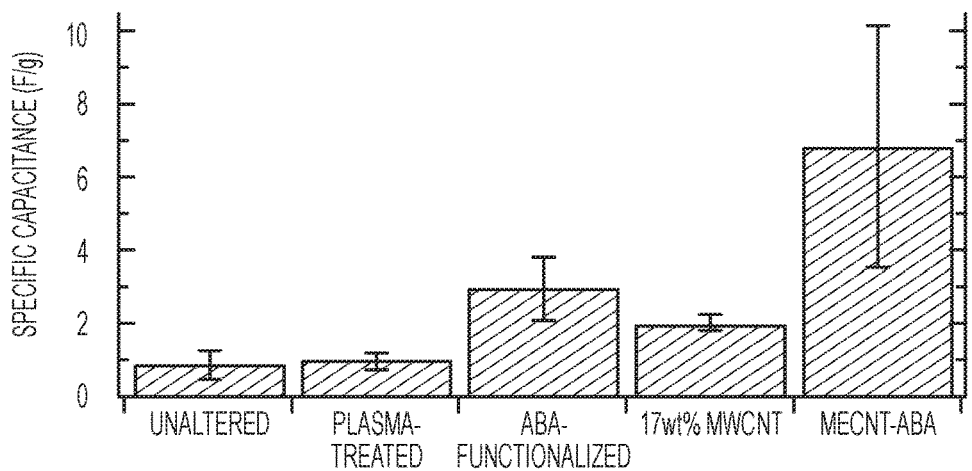
FIG. 5A illustrates the specific capacitance of various carbon fiber electrodes in 1M KCl electrolyte measured with CV experiments at 1 mV/s.
Figure 5B:
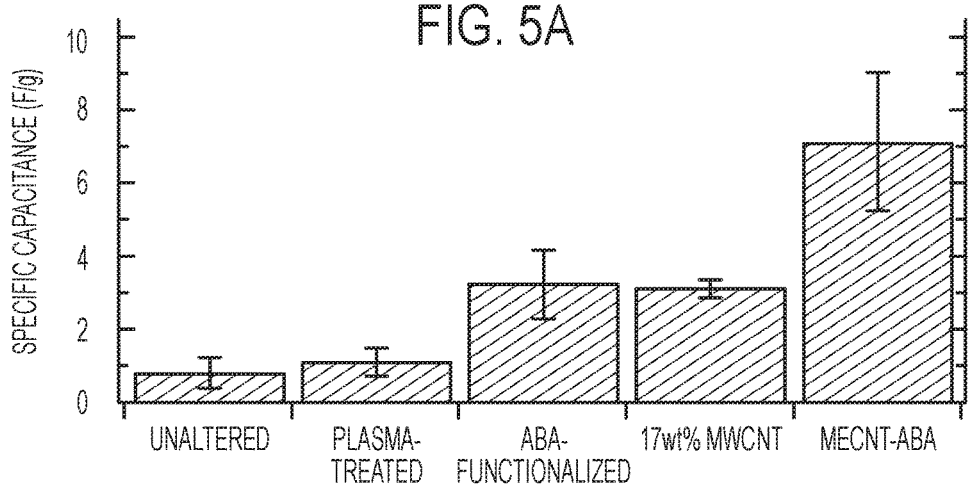
FIG. 5B illustrates the specific capacitance of various carbon fiber electrodes in 1M KCl electrolyte measured with CV experiments at 10 mV/s.
Figure 5C:
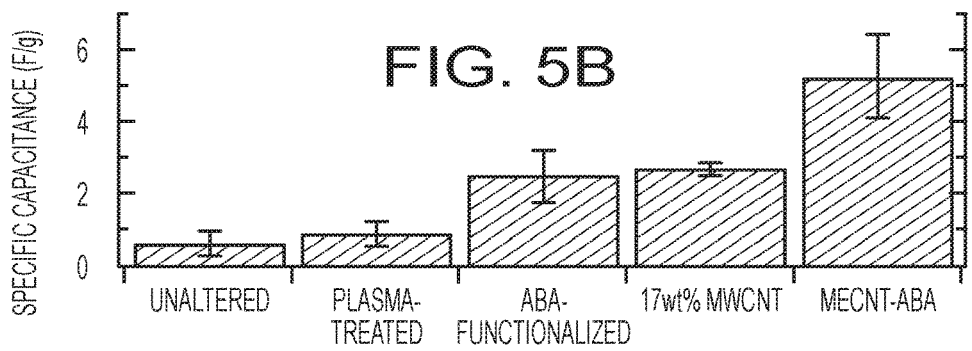
FIG. 5C illustrates the specific capacitance of various carbon fiber electrodes in 1M KCl electrolyte measured with CV experiments at 100 mV/s.

FIGS. 5A-5C illustrate the specific capacitance of various carbon fiber electrodes in 1M KCl electrolyte measured with CV experiments at (a) 1 mV/s, (b) 10 mV/s, and (c) 100 mV/s. In FIGS. 5A-5C, bar height and error bars represent the average and standard deviation, respectively, of three replicate electrodes for each condition. The specific capacitance values were calculated from CVs of the modifications discussed thus far and are summarized in the bar graphs in FIGS. 5A-5C (three different scan rates: 1, 10, and 100 mV/s corresponding to discharge times of 17 minutes, 100 seconds, and 10 seconds). As shown in FIGS. 5A-5C, unaltered carbon fiber electrodes exhibited specific capacitance values ranging from 0.84 to 0.62 F/g for scan rates of 1 to 100 mV/s. Accordingly, carbon fiber by itself appears to be a poor material for the base of an electrode. Initial plasma treatment for each electrode improved the short-term wettability and slightly increased its capacitance. However, the higher specific capacitance values produced by plasma treatment on average were within the standard deviation observed in bare carbon fiber electrodes. In contrast to bare or plasma-treated carbon fiber electrodes, improvements in specific capacitance were achieved through MWCNT impregnation, ABA functionalization, and MWCNT-ABA combination (the MWCNT-ABA combination electrode had a 17% MWCNT relative to bare carbon fiber weight which was the same as the MWCNT electrode). Surface functionalization with ABA resulted in average specific capacitance values of 2.1 to 3.3 F/g over the range of rates tested. MWCNT impregnation at 17% relative to carbon fiber sheet weight produced electrodes with average specific capacitance of 2.0 to 3.1 F/g, with the highest capacitance at 10 mV/s. The combination of the two approaches produced electrodes with average specific capacitance values ranging from 4.4 to 7.2 F/g. The highest capacitance, nine times higher than that of the unaltered carbon fiber electrode, was achieved at 5 mV/s. The tendency for lower capacitance values at higher cycling rates could be because the kinetics of pseudocapacitive electrode reactions are slower and more rate-dependent than the double-layer charging mechanisms of non-faradaic electrodes.

Figure 6:
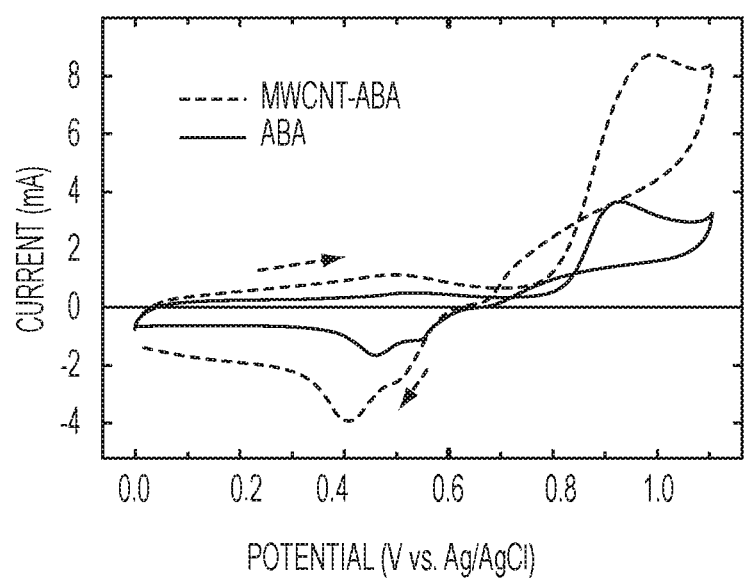
FIG. 6 illustrates the electrochemical polymerization of aniline on ABA-functionalized carbon fiber and MWCNT-ABA carbon fiber.

Conducting Polymer Deposited Electrode: As stated above, conducting polymers can be electrochemically synthesized and simultaneously deposited on an electrode surface through the electro-oxidation of monomers. Here, electropolymerization of aniline on carbon fiber cloth was performed via cyclic voltammetry in 0.1M aniline/1M $H_2SO_4$ solution. The electrochemical polymerization of aniline is shown in FIG. 6. Specifically, the first ten CV (10 mV/s) on ABA-functionalized carbon fiber electrodes and three cycles on MWCNT-ABA-impregnated carbon fiber electrodes are shown in FIG. 6. The oxidation peak around 0.9 V vs. Ag/AgCl corresponds to free radical formation and electron extraction from aniline molecules. The current values for MWCNT-ABA-impregnated carbon fiber were significantly higher than those of ABA carbon fiber most likely because of the increased surface area for reaction sites from the added carbon nanotubes. In subsequent cycles during the polymerization process, the current values around the 0.5V peak pair increased most likely due to doping and de-doping of the newly formed polymer.

Following each of the first five polymerization cycles on ABA-functionalized carbon fiber, the electrode was rinsed thoroughly with water to remove any unreacted monomer and placed in 1M KCl for CV characterization. Following these first five cycles, five more polymerization CV cycles were conducted for a total of 10. To estimate the total amount of polymer deposited, the mass of each electrode was measured with a laboratory balance after full electrochemical characterization, rinsing, drying, and removal from the glassy carbon substrate. The amount of oxidative current remained relatively constant during subsequent polymerization cycles, so the mass of the deposited polymer at intermediate stages was estimated assuming a linear increase in weight with each cycle.

Figure 7:
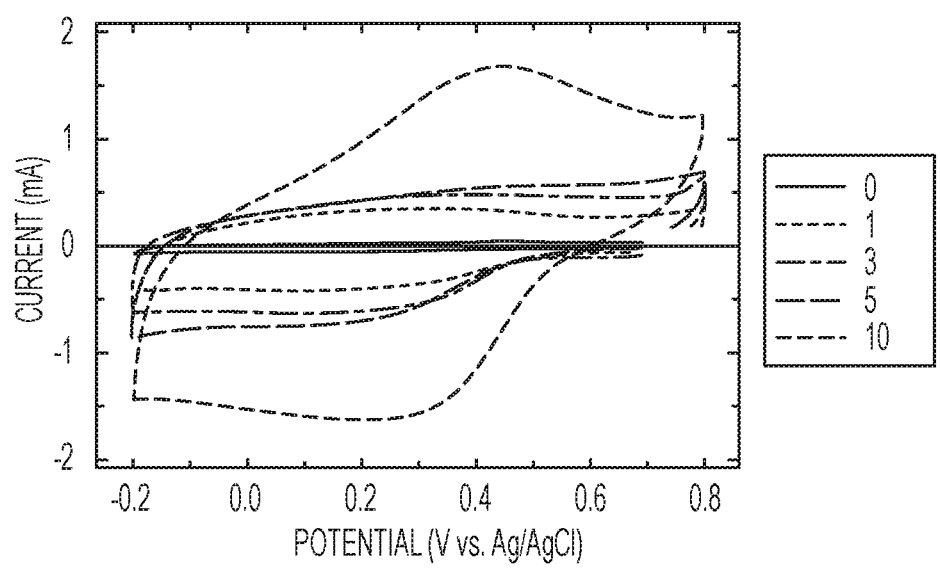
FIG. 7 illustrates the effect of the amount of conducting polymer on CV of carbon fiber electrodes.

Characterization CVs for increasing amounts of deposited polymer are shown in FIG. 7. The legend of FIG. 7 indicates the number of polymerization CV cycles. The amount of current increased with the amount of electrochemically synthesized polyaniline deposited on the carbon fiber. The CV shape is largely faradaic most likely because of the doping/de-doping reaction. It was not possible to distinguish the 2-3 redox peak-pairs typically observed with polyaniline electrodes in sulfuric acid solution because potassium chloride (1M) solution was used as the characterization electrolyte. However, potassium chloride is more typically used in structural supercapacitor studies and may therefore give a more accurate prediction of how the electrode would perform with a non-acid solid polymer electrolyte.

Figure 8:
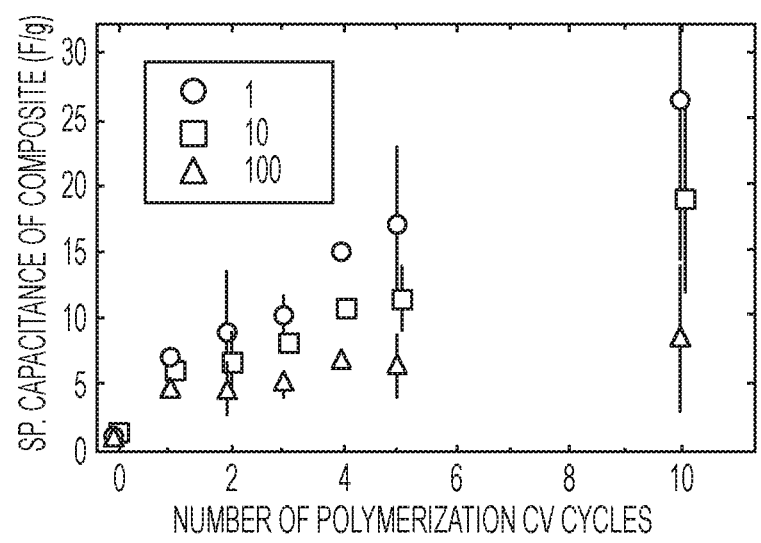
FIG. 8 illustrates the specific capacitance of polyaniline-modified carbon fiber electrodes after increasing amounts of polyaniline deposition in 1M KCl electrolyte measured with CV experiments at 1, 10, and 100 mV/s.

The specific capacitance values for increasing amounts of deposited polyaniline on carbon fiber electrodes at three CV scan rates (1, 10, 100 mV/s) are shown in FIG. 8. The specific capacitance values are relative to estimated total electrode weight (carbon fiber plus polyaniline) and are measured with CV experiments in 1M KCl electrolyte at the scan rate (in 1, 10, and 100 mV/s) indicated in the legend. Markers and error bars are the average and standard deviation, respectively, of measurements on three replicate electrodes. As shown in FIG. 8, the specific capacitance increased significantly with each cycle of deposition. The specific capacitance values were rate dependent most likely because of the kinetic limitations of the pseudocapacitive polyaniline doping reaction.

Figure 9:
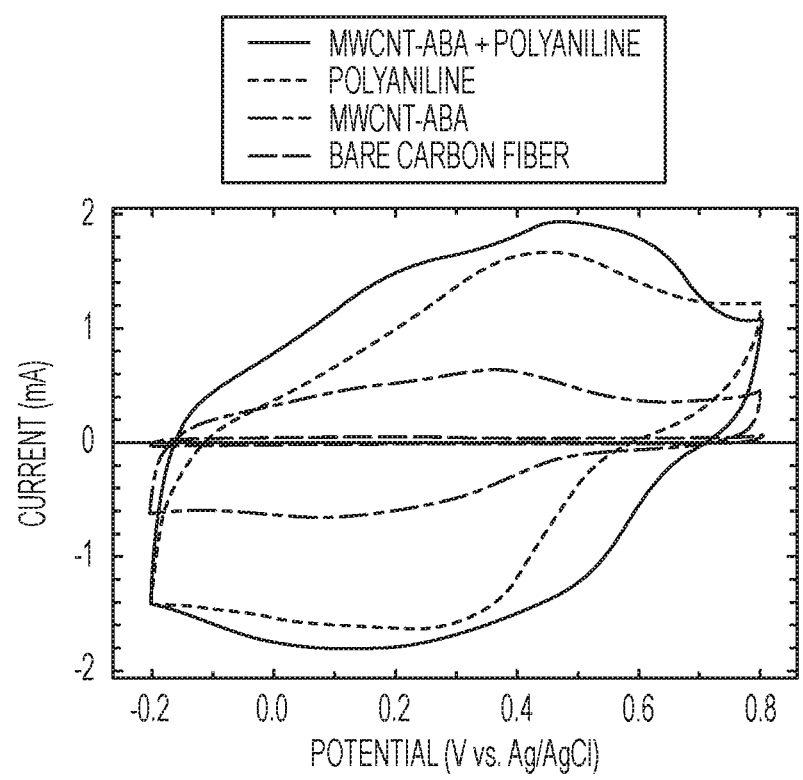
FIG. 9 illustrates the effect of MWCNT impregnation, ABA functionalization, and polyaniline deposition on CV (10 mV/s) of carbon fiber electrodes in 1M KCl electrolyte.
Figure 10A:
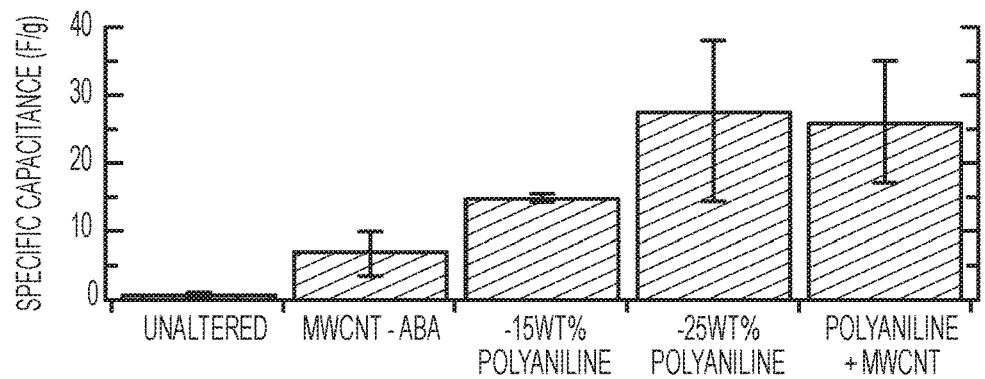
FIG. 10A illustrates the specific capacitance of various carbon fiber electrodes in 1M KCl electrolyte measured with CV experiments at 1 mV/s.
Figure 10B:
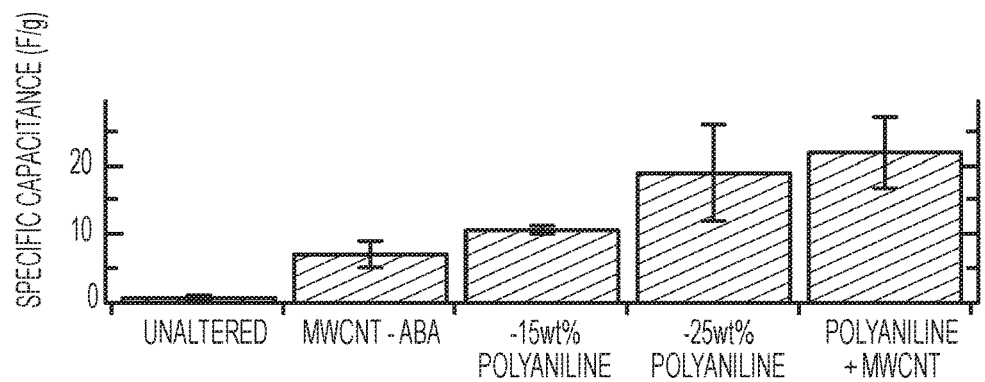
FIG. 10B illustrates the specific capacitance of various carbon fiber electrodes in 1M KCl electrolyte measured with CV experiments at 10 mV/s.
Figure 10C:
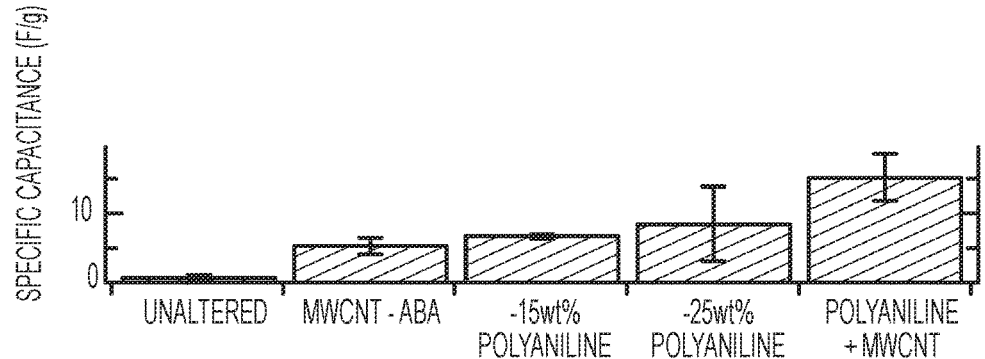
FIG. 10C illustrates the specific capacitance of various carbon fiber electrodes in 1M KCl electrolyte measured with CV experiments at 100 mV/s.

MWCNT-ABA-Polyaniline Electrode: Carbon fiber electrodes that were previously loaded with 17% MWCNT relative to the weight of the carbon fiber and functionalized with ABA were subjected to three CV cycles in the aniline solution (the first of these is shown in FIG. 6). The amount of polyaniline is the percentage relative to the weight of the carbon fiber. The electrodes were rinsed and placed in 1M KCl electrolyte solution for CV characterization. The results are shown in FIG. 9 for the scan rate of 10 mV/s. As shown in FIG. 9, the hybrid MWCNT-ABA-polyaniline electrode produced higher current than either the MWCNT-ABA electrode or the polyaniline electrode. Taking into account the weight added, a summary of the specific capacitance averages and standard deviations at 1, 10, and 100 mV/s are shown in the bar graphs in FIGS. 10A-C. The bar height and error bars are the average and standard deviation, respectively, of three replicate electrodes for each condition. Although not specifically stated, each electrode was ABA functionalized except the unaltered carbon fiber electrode. The hybrid electrode demonstrated an improvement over the MWCNT-ABA electrode at all rates, reaching 26 F/g at 1 mV/s. At rates of 1 and 10 mV/s, there is not that big of a difference between the electrode containing ABA and 25% polyaniline relative to the weight of the carbon fiber and the hybrid electrode. However, at higher rates of 50 to 200 mV/s, the hybrid electrode may have an advantage over an ABA-polyaniline electrode as its average specific capacitance values were 1.5 to 2 times higher than those of the ABA-polyaniline electrode. This trend could be because the high surface area of the MWCNT would be more crucial at higher charge-discharge rates (supercapacitor-like behavior), and the redox reaction of polyaniline would produce more charge-storage capacity at lower rates (pseudocapacitor- or battery-like behavior).

At 5 mV/s in KCl electrolyte, the carbon fiber electrodes with ABA-polyaniline and hybrid MWCNT-ABA-polyaniline exhibited specific capacitances of 21±8 F/g and 22±6 F/g, respectively. These performance indicators exceed those of carbon aerogel-modified carbon fiber electrodes developed for structural supercapacitors which achieved 14.3±0.2 F/g under similar conditions.

Structural Supercapacitor Testing

Structural Supercapacitor Fabrication with Solid Electrolyte:

Carbon fiber fabric (as electrodes) and glass fiber fabric (as separators) were cut into rectangular sheets with the fibers oriented either parallel to the rectangle edge or 45° to the rectangle edge. Each supercapacitor consisted of four fabric layers stacked in this order: carbon (parallel orientation), glass (45° orientation), glass (parallel orientation), and carbon 45° orientation). For the polymer electrolyte, 1.5 wt % Luperox DI was added to the monomer-salt stock solution, mixed with a stir bar for 5 minutes, and immediately poured onto the fabric stack. The fabric stack was placed between layers of nylon peel-ply, fluoropolymer sheet, and flat glass plates. Weights corresponding to 0.3 psi (relative to the area of the fabric sheets) were placed on top, and the entire assembly was placed in an oven at 140° C. for four hours. Following cool-down, the nylon and fluoropolymer sheets were peeled off, and the resultant solid composite was placed in the oven at 160° C. for one hour to complete polymerization and drive off initiator vapor.

MWCNT-modified supercapacitor fabrication included MWCNT suspension deposited onto two plasma-treated carbon fiber fabric sheets in the approximate amount of 1 mL per square inch and allowed to dry in air for at least 6 hours. This deposition was repeated until the nanotube weight amounted to about 17% of the carbon fiber weight. These sheets were used as electrodes with glass fiber separators and polymer electrolyte to fabricate structural supercapacitors in the same way as described above.

MWCNT/ABA/polyaniline-modified supercapacitor fabrication included MWCNT suspension deposited onto two plasma-treated carbon fiber fabric sheets in the approximate amount of 1 mL per square inch and allowed to dry in air for at least 6 hours. This deposition was repeated until the nanotube weight amounted to about 17% of the weight of the carbon fiber. Each of these sheets was placed in a beaker with ABA electrolyte solution. Electrochemical surface functionalization with ABA was performed via CV as described above for the electrode modifications. The electrode sheets were then rinsed, allowed to dry, and transferred to a beaker with aniline electrolyte solution. Electrochemical synthesis and deposition of polyaniline was performed via CV as described above for the electrode modifications (except using three consecutive CV cycles at 10 mV/s). The electrode sheets were then rinsed, allowed to dry, and used as electrodes with glass fiber separators and polymer electrolyte to fabricate structural supercapacitors in the same way as described above. The weight of deposited polyaniline in this case was estimated to be about 5-10% relative to the weight of the unaltered carbon fiber.

MWCNT-impregnated electrodes and MWCNT-ABA-polyaniline electrodes were fabricated in the same manner as described above but scaled up from 0.77 in$^2$ (small disk for individual electrode testing) to 6 in$^2$ (sheets for electrochemical testing) or 30 in$^2$ (sheets for mechanical testing). The solid polymer electrolyte used was a random copolymer identified as $(1A12.5-OMe)_{0.75}$-r-$(4A4-PE)_{0.25}$ (a copolymer of methoxy polyethylene glycol monoacrylate and ethoxylated pentaerythritol tetraacrylate) containing lithium triflate as the ionic component. This electrolyte has a balance of sidechains for promoting ion condition and crosslinks for promoting high moduli, representing a balance between electrochemical and mechanical performance for the structural supercapacitor.

Electrochemical Testing of Supercapacitors: Triplicate ⅜"-diameter disks were punched out of each of the supercapacitor composite sheets (unmodified carbon fiber, MWCNT-modified, and MWCNT/ABA/polyaniline-modified). Each disk (a single supercapacitor cell) was placed in a spring-loaded, Swagelok-type test fixture with stainless steel 316 current collectors. The Swagelok cells were connected to a Metrohm Autolab potentiostat for testing at room temperature. Electrochemical characterization consisted of CV at 200, 100, 50, 10, 5, 1, and 0.5 mV/s over the range 0.0 to +1.0 V. Cycles were repeated 5-20 times until stable values were achieved. Capacitance was calculated by integrating the current-time curve for the reductive (negative current) portion of the last cycle. Specific capacitance of the supercapacitor cells is relative to the total cell weight (weight of electrodes plus separator plus electrolyte).

Figure 11A:
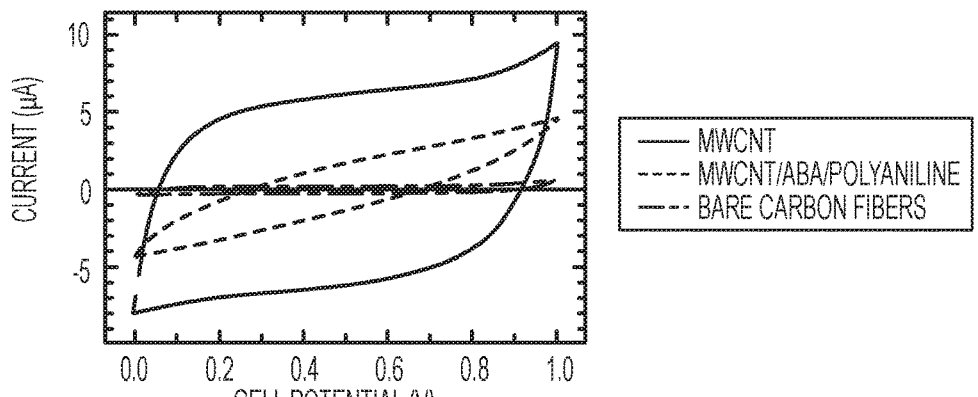
FIG. 11A illustrates the CV of structural supercapacitors with bare carbon fiber, MWCNT-impregnated carbon fiber, and MWCNT/ABA/polyaniline-modified carbon fiber electrodes at a scan rate of 0.5 mV/s.
Figure 11B:
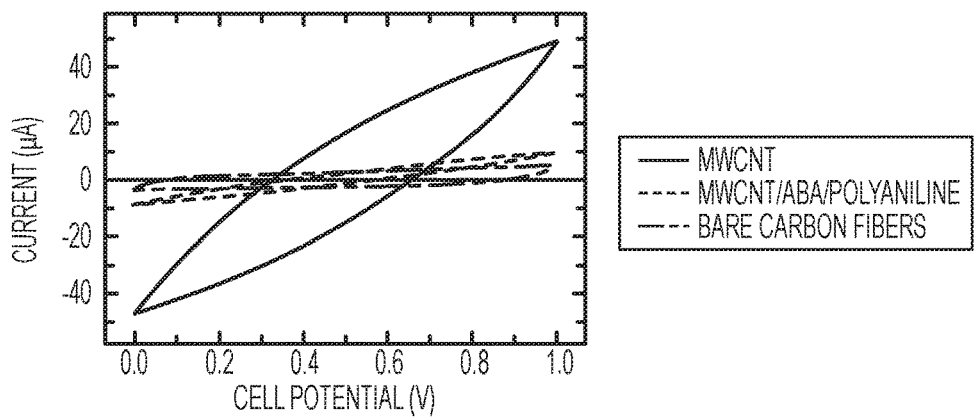
FIG. 11B illustrates the CV of structural supercapacitors with bare carbon fiber, MWCNT-impregnated carbon fiber, and MWCNT/ABA/polyaniline-modified carbon fiber electrodes at a scan rate of 10 mV/s.
Figure 11C:
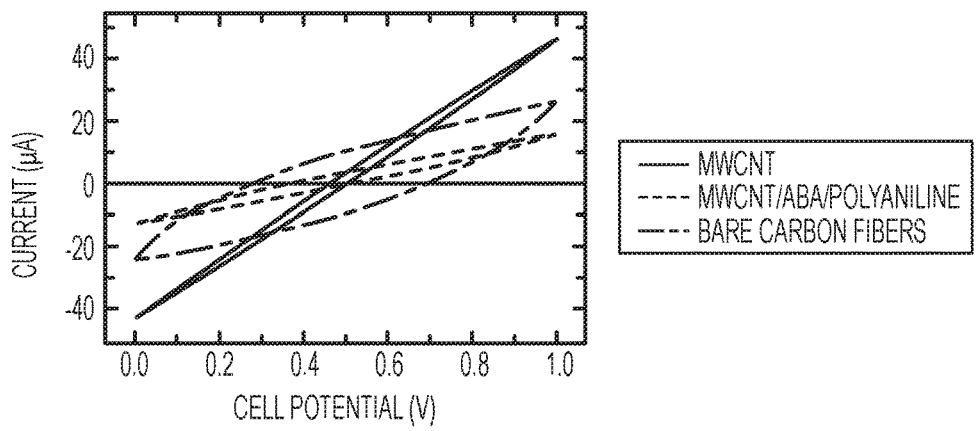
FIG. 11C illustrates the CV of structural supercapacitors with bare carbon fiber, MWCNT-impregnated carbon fiber, and MWCNT/ABA/polyaniline-modified carbon fiber electrodes at a scan rate of 200 mV/s.

Supercapacitor cells were weighed and tested with cyclic voltammetry in a two-electrode cell to quantify the specific (gravimetric) capacitance. CV results at three scan rates (0.5, 10, and 200 mV/s) of structural supercapacitors with electrodes made of bare carbon fiber, MWCNT-impregnated carbon fiber, and MWCNT-ABA-polyaniline carbon fiber are shown in FIGS. 11A-C. At the higher scan rates, the almost linear shapes of the CV curves indicate that the cells are acting like resistors more than capacitors. This may be a result of high electrolyte resistance and high leakage current. Solid-state supercapacitors with unaltered carbon fiber electrodes exhibited a CV shape characteristic of supercapacitor behavior at scan rates 10 mV/s and lower. Solid-state supercapacitors with MWCNT-impregnated carbon fiber electrodes exhibited a CV shape characteristic of supercapacitor behavior at scan rates of 0.5 and 1 mV/s and lower.

Figure 12:
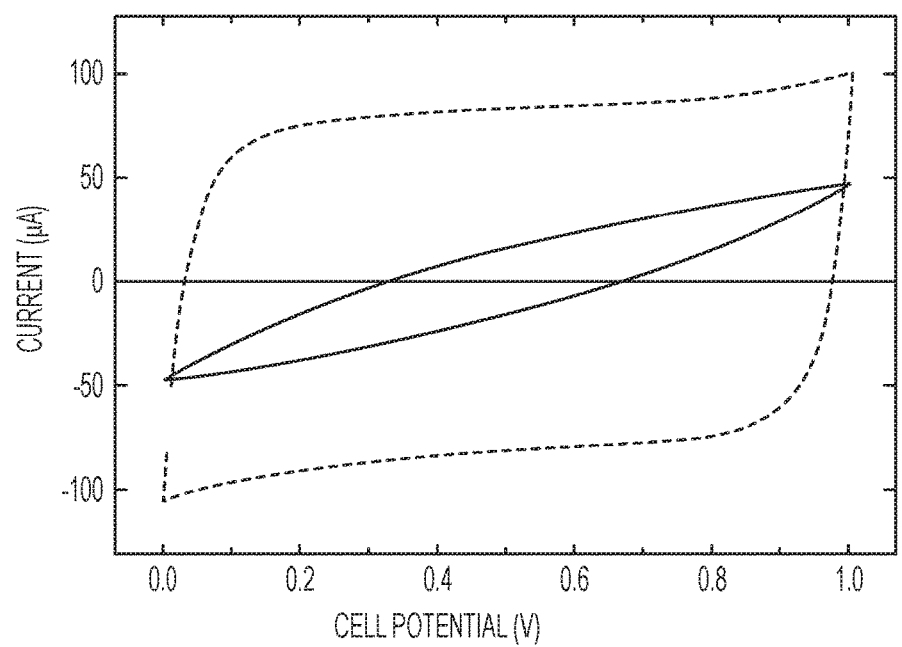
FIG. 12 illustrates the effect of ionic liquid on CV of MWCNT-impregnated structural supercapacitors.
Figure 13A:
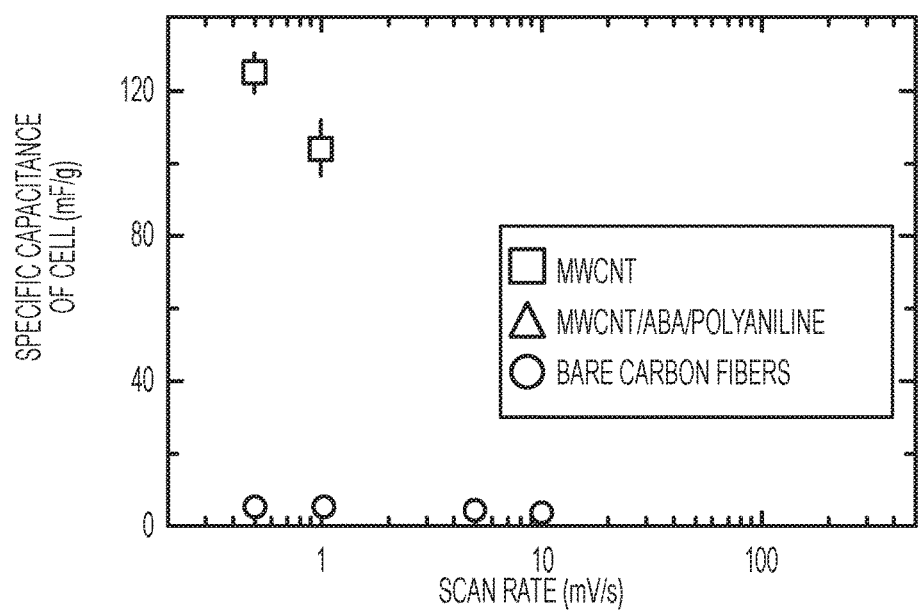
FIG. 13A illustrates the specific capacitance of a solid-state supercapacitor with electrodes made of bare carbon fiber, MWCNT-impregnated carbon fiber, and MWCNT/ABA/polyaniline-modified carbon fiber.
Figure 13B:
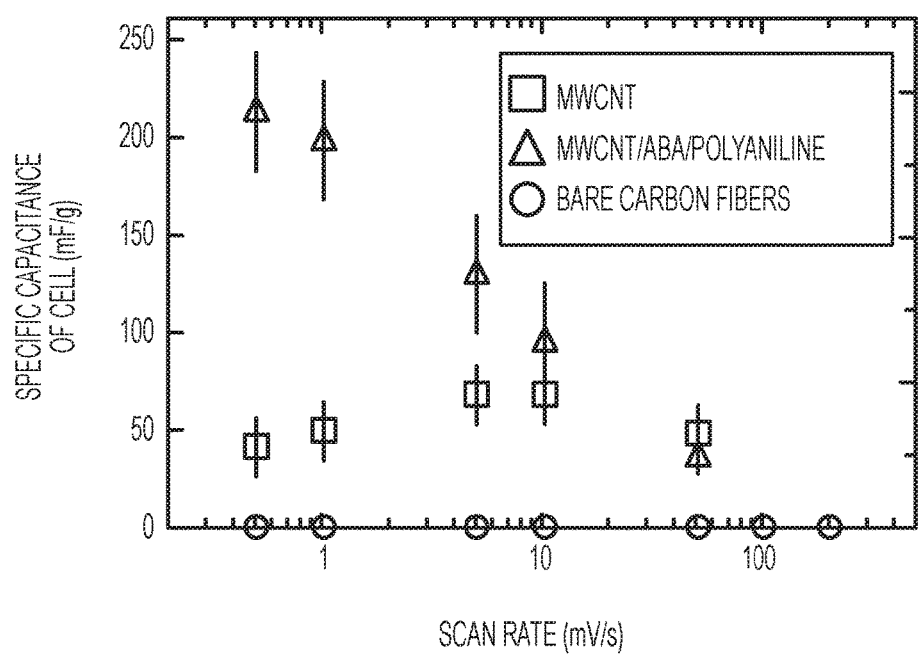
FIG. 13B illustrates the specific capacitance of a supercapacitor with 40 wt % EMI-TFSI added having electrodes made of bare carbon fiber, MWCNT-impregnated carbon fiber, and MWCNT/ABA/polyaniline-modified carbon fiber.
Figure 14A:
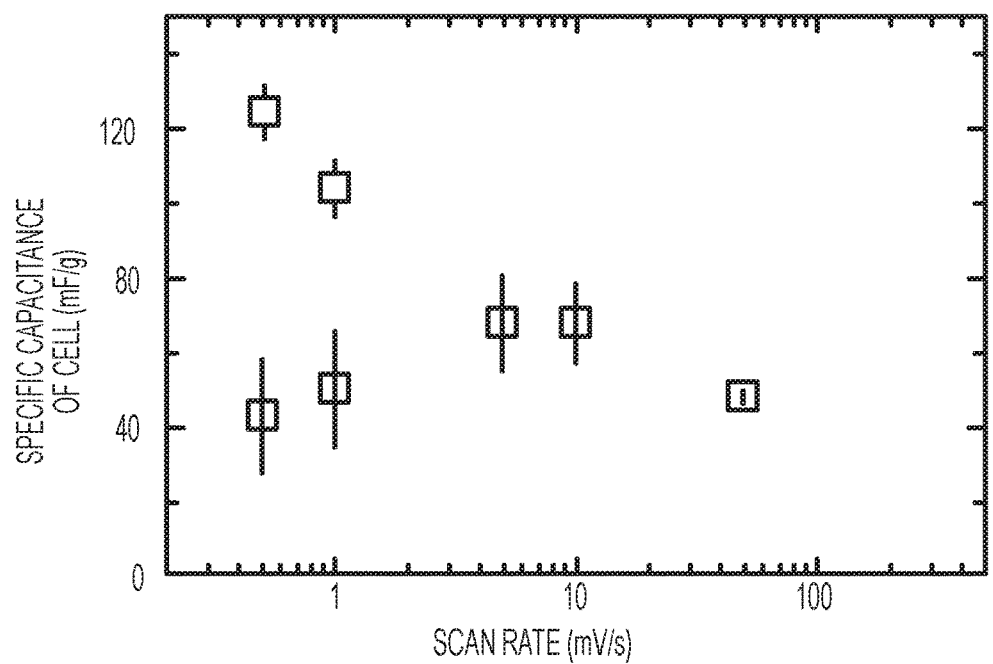
FIG. 14A illustrates the specific capacitance of a solid-state supercapacitor (filled markers) and supercapacitors with 40 wt % 1-ethyl-3-methylimidazolium bis(trifluoromethylsulfonyl)imide (EMI-TFSI) added (unfiled markers) having electrodes composed of MWCNT-impregnated carbon fiber.
Figure 14B:
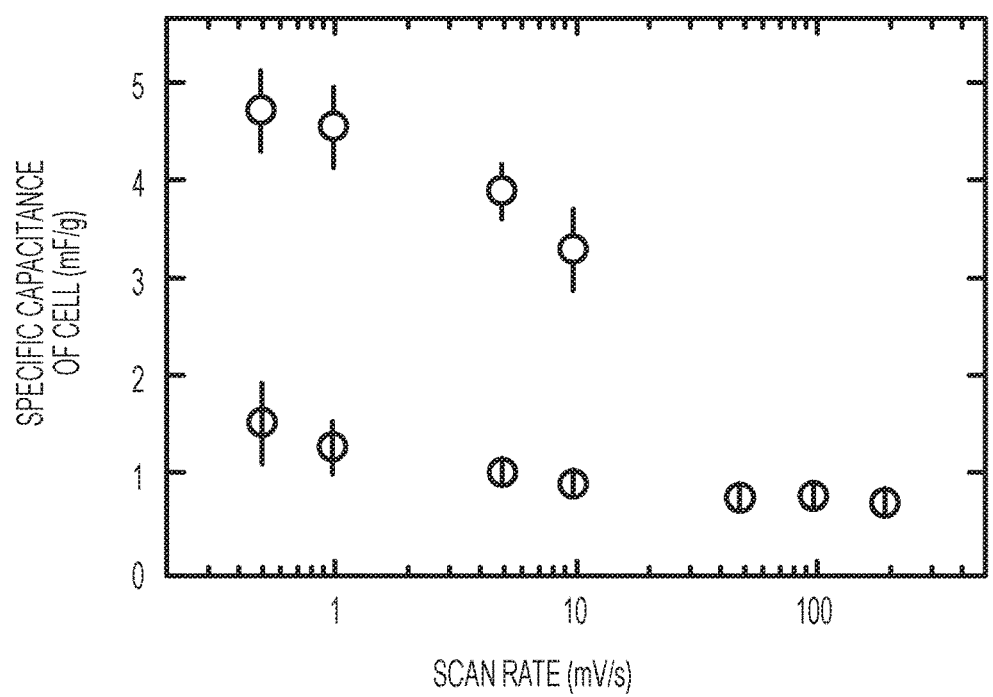
FIG. 14B illustrates the specific capacitance of a solid-state supercapacitor (filled markers) and supercapacitors with 40 wt % EMI-TFSI added (unfiled markers) having electrodes composed of bare carbon fiber.

After electrochemical testing of the all-solid-state cells was completed, the effect of ionic liquid as a supplemental electrolyte was examined. Ionic liquid was incorporated by depositing 50 μL of EMI-TFSI onto the solid-state composite cell and allowing it to soak in for several minutes. The ionic liquid amounted to about 40% of the total cell weight. CV characterization was performed in the same way as the all-solid-state cells. The effect of ionic liquid (EMI-TFSI) on the electrochemical behavior of a MWCNT-impregnated structural supercapacitor is shown in FIG. 12. Specifically, cyclic voltammetry at 10 mV/s of a MWCNT solid-state structural supercapacitor (solid line) and the same supercapacitor with 40 wt % EMI-TFSI added (dashed line) is shown. As shown in FIG. 12, incorporation of the ionic liquid resulted in the classic supercapacitor CV shape and greatly increased the charge-storage capacitance.

Specific capacitances for the supercapacitors with electrodes made of bare carbon fiber, MWCNT-impregnated carbon fiber, and MWCNT/ABA/polyaniline-modified carbon fiber and with 40 wt % ionic liquid (EMI-TFSI) are shown in FIG. 13A-B and FIG. 14A-B. The values are relative to the total weight of all supercapacitor components (not including the Swagelok-type cell fixture). Markers and error bars are the average and standard deviation, respectively, of measurements on three replicate cells from the same composite sheet. Data is given only for cases in which the shape of the CV curve was characteristic of a supercapacitor.

Depending on the scan rate, the specific capacitance of solid-state supercapacitors with unaltered carbon fibers ranged from 3.3 to 4.7 mF/g. The incorporation of 17% MWCNT (relative to the weight of carbon fiber) resulted in a 26 and 23 fold improvement in specific capacitance. An average of 125 mF/g was measured in the solid-state MWCNT supercapacitor, which is 28 times higher than previously reported performance. Using the typical formula $E=1/2 CV^2$ to calculate specific energy, the value for this cell is 17.4 mWh/kg.

Although incorporating the ionic liquid was detrimental to the performance of the supercapacitor with unaltered carbon fiber, it enabled capacitor-like performance in MWCNT and MWCNT-ABA-polyaniline supercapacitors at rates up to 50 mV/s. The highest specific capacitance found, at 212 mF/g, is 4 to 19 times higher than that of previous reports of IL-incorporated structural supercapacitors utilizing active carbon fiber electrodes and glass fiber separators.

Based on these results, it is possible that the redox mechanism inherent to conducting polymers such as polyaniline may be improved by the mobility of a liquid electrolyte. This mechanism involves the electro-oxidative extraction of electrons from the conjugated polymer backbone with concomitant charge compensation by a mobile anion.

Mechanical Testing of Supercapacitors: Large sheets (e.g. 30 in$^2$ sheets) of the solid-state-supercapacitors (with and without MWCNT) were cut into five pieces and shipped to Innovative Test Solutions (Schenectady, N.Y.) for mechanical testing. Three point bending tests were performed on the supercapacitor sheets according to ASTM D790. Maximum flexural strength and flexural modulus of elasticity are reported as the average and standard deviation of the measurements for the five individual pieces of each supercapacitor.

The results of the mechanical tests for both solid-state structural supercapacitors with unaltered carbon fiber electrodes and MWCNT-impregnated carbon fiber electrodes are provided in the below Table 1. (Values are the average of five tests with standard deviation in parenthesis).

TABLE 1

| Electrode type | Maximum Flexural Strength (MPa) | Flexural Modulus of Elasticity (GPa) |
|---|---|---|
| Unaltered Carbon Fiber | 16.74 (2.29) | 3.16 (0.59) |
| 2 wt % MWCNT-modified carbon fiber | 21.32 (3.73) | 2.94 (0.87) |

The flexural strength of the structural supercapacitors was measured at about 17-21 MPa and the flexural modulus of the structural supercapacitors was measured at about 3 GPa. As such, the incorporation of MWCNT into the electrode structure had no measurable effect on the flexural modulus but did result in a 27% higher average flexural strength.

This application discloses several numerical ranges in the text and figures. The numerical ranges disclosed inherently support any range or value within the disclosed numerical ranges even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. An electrode for a structural supercapacitor comprising: a carbon fiber sheet comprising carbon nanotubes, redox-active moieties, and a conducting polymer.

2. The electrode of claim 1, wherein the redox-active moieties are on the carbon nanotubes.

3. The electrode of claim 2, wherein the conducting polymer is on the redox-active moieties.

4. The electrode of claim 1, wherein the conducting polymer is polyaniline.

5. The electrode of claim 1, wherein the weight of the conducting polymer amounts to 15-35% of the weight of the carbon fiber sheet.

6. The electrode of claim 1, wherein the weight of carbon nanotubes amounts to 10-25% of the weight of the carbon fiber sheet.

7. The electrode of claim 1, wherein the redox-active moieties comprise aminobenzoate moieties.

8. A structural supercapacitor comprising:
at least two carbon fiber sheets comprising carbon nanotubes, redox-active moieties, and a conducting polymer; and
a solid electrolyte.

9. The structural supercapacitor of claim 8, further comprising at least one separator between a first carbon fiber sheet and a second carbon fiber sheet.

10. The structural supercapacitor of claim 9, wherein the separator comprises glass fiber.

11. The structural supercapacitor of claim 8, wherein the redox-active moieties are on the carbon nanotubes.

12. The structural supercapacitor of claim 9, wherein the conducting polymer is on the redox-active moieties.

13. The structural supercapacitor of claim 8, wherein the conducting polymer is polyaniline.

14. The structural supercapacitor of claim 8, wherein the weight of the conducting polymer amounts to 15-35% of the weight of the carbon fiber sheet.

15. The structural supercapacitor of claim 8, wherein the weight of carbon nanotubes amounts to 10-25% of the weight of the carbon fiber sheet.

16. The structural supercapacitor of claim 8, wherein the redox-active moieties comprise aminobenzoate moieties.

17. The structural supercapacitor of claim 8, wherein the solid electrolyte is a polymer electrolyte.

18. The structural supercapacitor of claim 17, wherein the polymer electrolyte is a poly(ethylene glycol)-based polymer electrolyte.

19. The structural supercapacitor of claim 17, wherein the polymer electrolyte comprises a copolymer of methoxy polyethylene glycol monoacrylate and ethoxylated (4) pentaerythritol tetraacrylate containing lithium triflate as the ionic component.

20. The structural supercapacitor of claim 8, wherein at least a portion of the solid electrolyte is between the at least two carbon fiber sheets.

21. The structural supercapacitor of claim 8, further comprising at least one separator between a first carbon fiber sheet and a second carbon fiber sheet.

22. The structural supercapacitor of claim 8, wherein the specific capacitance is at least 100 mF/g.

23. The structural supercapacitor of claim 8, wherein the energy density is at least 15 mWh/kg.

24. The structural supercapacitor of claim 8, wherein the flexural strength is at least 20 MPa according to ASTM D790.

25. The structural supercapacitor of claim 8, wherein the flexural modulus is at least 2.5 GPa according to ASTM D790.

26. The structural supercapacitor of claim 8, wherein the structural supercapacitor is an all-solid-state structural supercapacitor.

* * * * *